United States Patent
Connor et al.

(10) Patent No.: US 9,602,517 B2
(45) Date of Patent: *Mar. 21, 2017

(54) RESOURCE-CENTRIC AUTHORIZATION SCHEMES

(71) Applicant: Red Hat, Inc., Raleigh, NC (US)

(72) Inventors: Jason L. Connor, Fort Collins, CO (US); Michael B. McCune, Beaverton, OR (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/154,412

(22) Filed: May 13, 2016

(65) Prior Publication Data

US 2016/0255096 A1   Sep. 1, 2016

Related U.S. Application Data

(60) Continuation of application No. 14/223,989, filed on Mar. 24, 2014, now Pat. No. 9,344,430, which is a
(Continued)

(51) Int. Cl.
*H04L 29/06* (2006.01)
*G06F 21/60* (2013.01)

(52) U.S. Cl.
CPC .......... *H04L 63/105* (2013.01); *G06F 21/604* (2013.01); *H04L 63/08* (2013.01); *H04L 63/10* (2013.01)

(58) Field of Classification Search
CPC ....... H04L 63/10; H04L 63/08; H04L 63/105; G06F 21/604
See application file for complete search history.

(56) References Cited

U.S. PATENT DOCUMENTS 5,911,143 A * 6/1999 Deinhart ............... G06F 21/604
5,956,715 A * 9/1999 Glasser ............. G06F 17/30221
(Continued)

OTHER PUBLICATIONS

Baktash et al., 2L-RBACG: a New Framework for Resource Access Control in Grid Environments, Published Jul. 2010, Retrieved from http://ce.aut.ac.ir/~meybodi/paper/Baktash-2010-Canada-Grid %20Security_Paper.pdf.*
(Continued)

*Primary Examiner* — Chau Le
(74) *Attorney, Agent, or Firm* — Lowenstein Sandler LLP

(57) ABSTRACT

A method includes receiving a request of a user to perform an operation with respect to a first resource, in response to the request, determining, in view of a resource-based master data structure, a first resource-based permission data structure associated with the first resource, and accessing the first resource-based permission data structure to identify a first resource entry associated with the user. The method further includes upon determining that the first resource entry does not indicate that the user has a permission to perform the requested operation with respect to the first resource, determining a second resource-based permission data structure associated with a second resource that is a parent of the first resource, accessing the second resource-based permission data structure to identify a second resource entry associated with the user, and upon determining that the second resource entry indicates that the user has a permission to perform the requested operation with respect to the second resource, allowing the user to perform the requested operation with respect to the first resource.

20 Claims, 9 Drawing Sheets

Related U.S. Application Data division of application No. 13/149,079, filed on May 31, 2011, now Pat. No. 8,689,298.

(56) References Cited

U.S. PATENT DOCUMENTS

| | | | | |
|---|---|---|---|---|
| 6,161,139 | A * | 12/2000 | Win | G06F 21/604 709/223 |
| 7,185,364 | B2 * | 2/2007 | Knouse | H04L 63/0815 709/225 |
| 8,689,298 | B2 | 4/2014 | Connor et al. | |
| 2002/0026592 | A1 * | 2/2002 | Gavrila | G06F 21/6218 726/6 |
| 2004/0019799 | A1 * | 1/2004 | Vering | G06F 21/6218 726/1 |
| 2004/0123153 | A1 * | 6/2004 | Wright | G06F 21/32 726/1 |
| 2005/0172151 | A1 * | 8/2005 | Kodimer | G06F 21/31 726/5 |
| 2007/0185875 | A1 * | 8/2007 | Chang | G06F 21/6218 |
| 2007/0283443 | A1 * | 12/2007 | McPherson | G06F 21/6218 726/26 |
| 2011/0010758 | A1 * | 1/2011 | Faitelson | G06F 9/468 726/4 |
| 2011/0197254 | A1 * | 8/2011 | Sallaka | G06F 21/6218 726/1 |
| 2012/0311672 | A1 * | 12/2012 | Connor | H04L 63/10 726/4 |

OTHER PUBLICATIONS

Office Action of U.S. Appl. No. 13/149,079 mailed Jun. 13, 2013.
Notice of Allowance of U.S. Appl. No. 13/149,079 mailed Nov. 7, 2013.
Office Action of U.S. Appl. No. 14/223,989 mailed Sep. 8, 2015.
Notice of Allowance of U.S. Appl. No. 14/223,989 mailed Jan. 14, 2016.

* cited by examiner

Role Table
111

| Role IDs | User IDs |
|---|---|
| Admin | User 1, User 2, ... |
| Power User | User 5, User 8, ... |
| ... | ... |

RESOURCE-CENTRIC AUTHORIZATION SCHEMES

RELATED APPLICATIONS

This application is a continuation of U.S. patent application Ser. No. 14/223,989, filed Mar. 24, 2014, which is a divisional of U.S. patent application Ser. No. 13/149,079, filed on May 31, 2011, both of which are incorporated herein by reference in their entirety.

TECHNICAL FIELD

Embodiments of the present invention relate generally to computing resource authorization. More particularly, embodiments of the invention relate to resource centric authorization schemes.

BACKGROUND

In a data processing system in which multiple different users access and execute operations, security and other access control measures may be necessary to prevent one or more users from accessing certain resources and/or executing certain operations. For example, an owner or creator of a file may wish to prevent other users from modifying the owner's file. Access controls are used to control which users have access to a file and what types of operations these users can perform on the file.

Conventionally, there are various types of access control mechanisms available such as discretionary access control (DAC) and role-based access control (RBAC). Discretionary access control permission is defined in accordance with the identity of the user or invoker of a command. A user or invoker may have an identity such as owner, member of a group, or other. Role based access control defines access to command execution based on what authorizations the user has been assigned rather than basing access on the user's identity. In role based access control, a role consists of a set of authorizations. A role is assigned to one or more users. Multiple roles may be assigned to a single user. Such access control mechanisms typically do not work well in a resource centric operating environment.

BRIEF DESCRIPTION OF THE DRAWINGS

The present invention is illustrated by way of example and not limitation in the figures of the accompanying drawings in which like references indicate similar elements.

FIG. 4 is a block diagram illustrating an example of a role database according to one embodiment of the invention.

DETAILED DESCRIPTION

In the following description, numerous details are set forth to provide a more thorough explanation of the embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to some embodiments, a resource centric-based authorization scheme is provided for access control in a resource centric operating environment. The resource centric-based authorization scheme is configured to associate a user with a resource and an operation on that resource. The authorization system may be implemented in representational state transfer (REST) compatible architecture, which may be accessible via a variety of Web-based communication protocols such as hypertext transfer protocol (HTTP). In one embodiment, a set of RESTful application programming interfaces (APIs) is designed to allow a user such as a regular user or an administrator to set up access controls on data and operations within a resource centric system. The APIs can also allow a user to specify users and groups of users to have restricted access rights to resources such as data objects or files. A user can also specify different types of access or permission (e.g., READ, WRITE, or DELETE) to the resources in the system.

Figure 1:
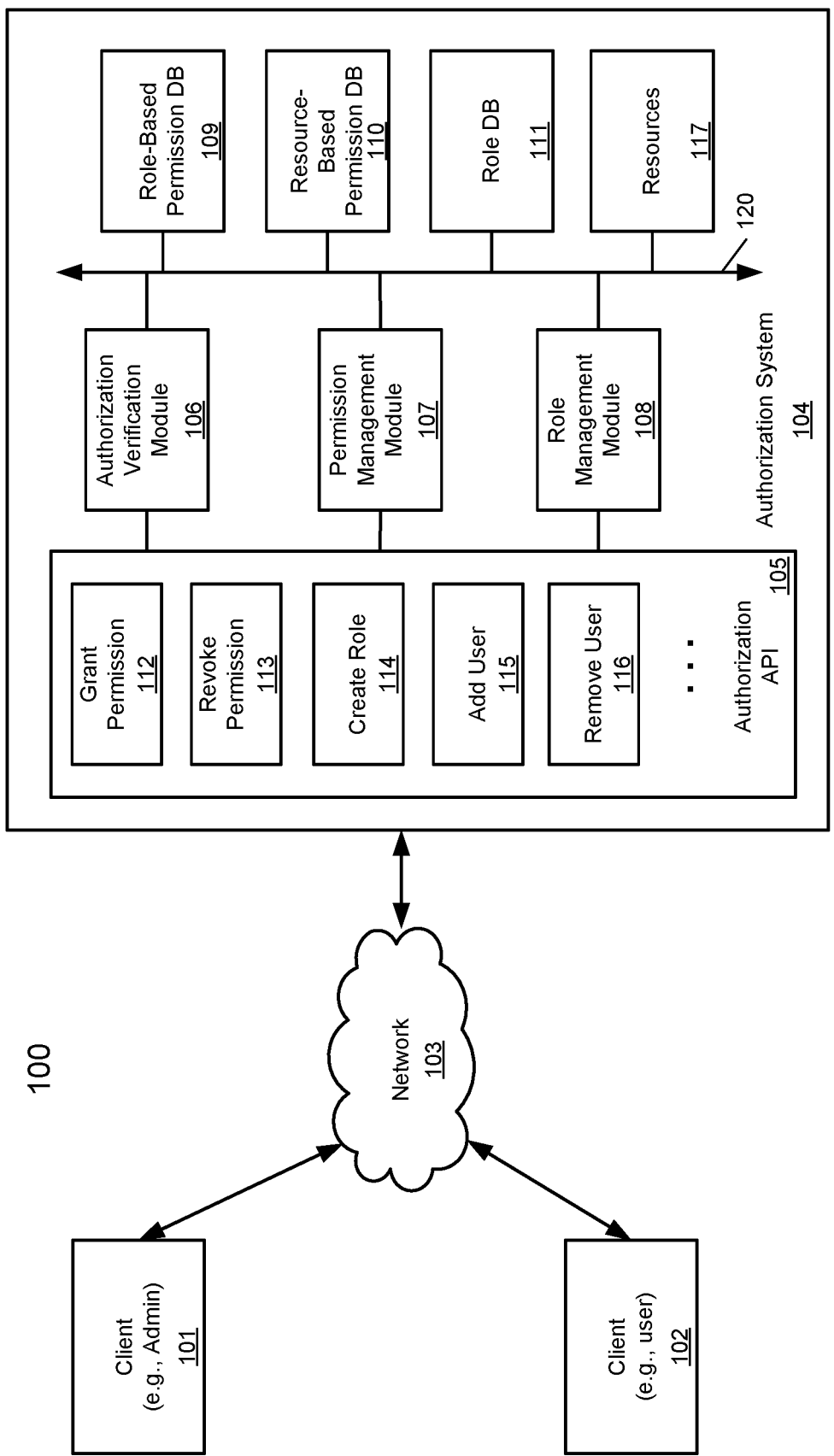
FIG. 1 is a block diagram illustrating a resource centric authorization system according to one embodiment of the invention.

FIG. 1 is a block diagram illustrating a resource centric authorization system according to one embodiment of the invention. Referring to FIG. 1, system 100 includes one or more clients 101-102 communicatively coupled to a resource centric authorization system 104 over a network 103. Clients 101-102 may be a regular user or an administrator operating from a variety of computing devices, such as a desktop, a laptop, a mobile device, etc. Network 103 can be any kind of networks such as local area network (LAN), a wide area network (WAN) or Internet, or a combination thereof, wired or wireless. System 104 may be a resource centric data or service provider server. For example, system 104 may be a part of a Red Hat Enterprise Linux (RHEL) system available from Red Hat®, Inc. of Raleigh, N.C.

In one embodiment, authorization system 104 includes a set of authorization APIs 105 to allow a user such as administrator 101 to grant or revoke a permission or role to another user such as user 102 for accessing resources 117 (e.g., data or files) stored in a storage device managed by system 104, where resources 117 may be local or remote resources. In one embodiment, a user can utilize APIs 105 to grant or revoke a permission of a resource to or from another user. A user can also utilize APIs 105 to grant or revoke permissions associated with a role for accessing a resource to or from one or more other users. A user can further utilize APIs 105 to add or remove a user to or from a specific role, which may be managed by role management module 108. The change of a role of a user may affect certain permissions of certain resources accessed by the user.

In one embodiment, APIs 105 include grant permission API 112 and revoke permission API 113 to grant and revoke a permission to and from a user or role, respectively, where the permissions may be stored in role-based permission database 109 and resource-based permission database 110, which may be managed by permission management module 107. Permission(s) to a particular resource can be granted or revoked via APIs 112-113 to a particular user based on information from resource-based permission database 110. Permission(s) associated with a role can be granted or revoked via APIs 112-113 based on information from role-based permission database 109 and/or resource-based permission database 110. In order for a first user (e.g., administrator 101) to change a permission of a second user, the first user has to be authorized and verified by authorization verification module 106. Such an authorization may be requested by the first user based on a resource having information indicating a desire to change a permission of the second user. Thus, in this embodiment, such an authorization is not determined based on a role of the first user. Rather, it can be determined based on a resource associated with an operation of changing a permission of the second user.

Figure 2:
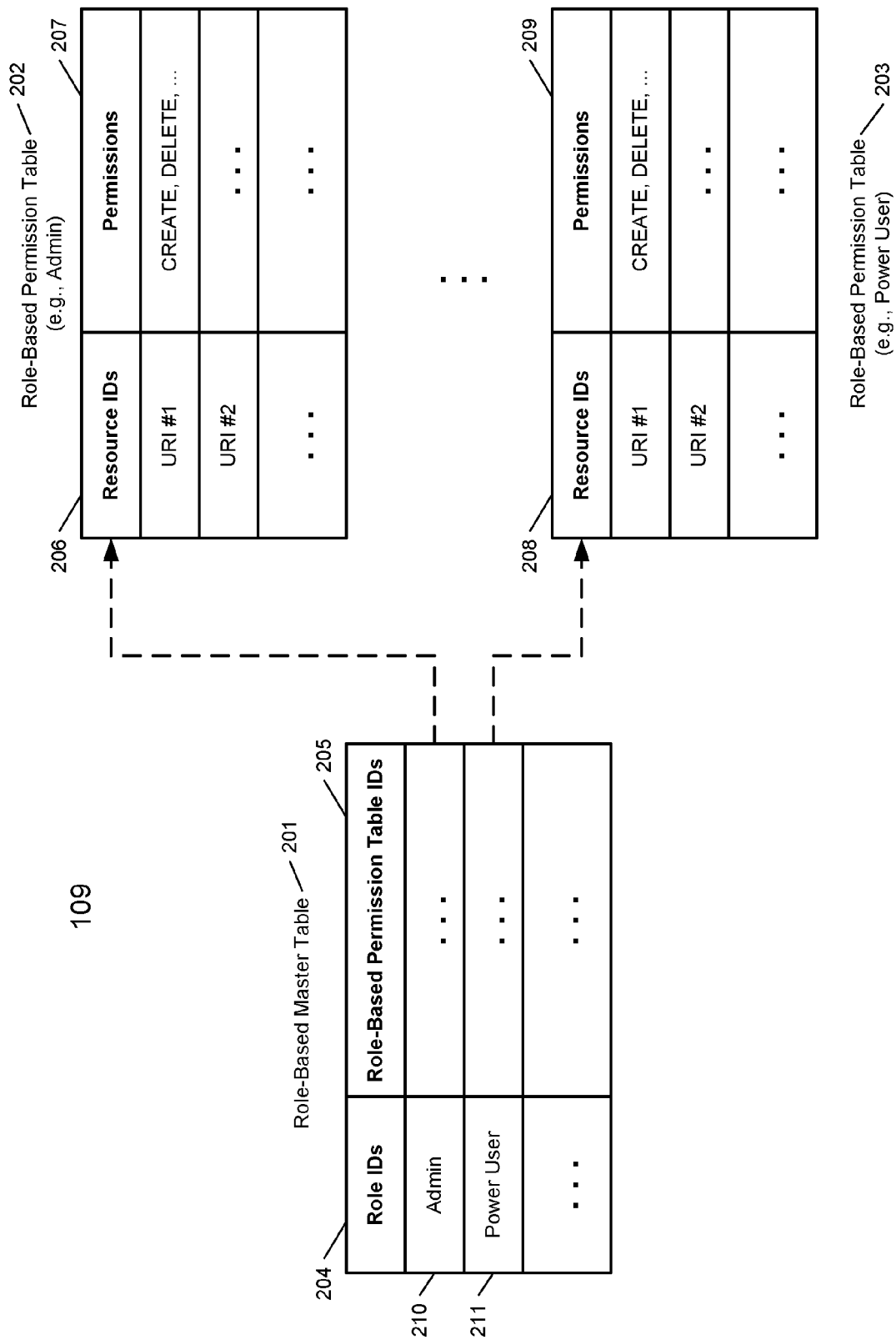
FIG. 2 is a block diagram illustrating an example of role-based permission database according to one embodiment of the invention.

FIG. 2 is a block diagram illustrating an example of role-based permission database according to one embodiment of the invention. Referring to FIG. 2, according to one embodiment, role-based permission database 109 includes role-based permission master table 201 having entries indexed based on role identifiers (IDs) 204 that identify a variety of roles. Examples of roles may include administrator, super user, power user, regular user, or other enterprise or organization specifically defined roles or titles. Each role, such as roles 210-211, is associated with one of role-based permission table ID 205 that uniquely identifies a particular role-based permission table associated with the corresponding role, such as, role-based permission tables 202-203. A role-based permission table ID may include a directory name and/or filename of a specific file that contains the corresponding role-based permission table. Throughout this application, a table is utilized as an example of a data structure. However, other forms of data structures, such as databases, data stores, files, etc. can also be utilized.

In one embodiment, each of the role-based permission tables 202-203 includes entries indexed based on resource IDs (e.g., URIs 206 and 208), and each of the resource IDs is associated with a list of one or more permissions or operations (e.g., permissions 207 and 209) that can be performed on the corresponding resource. That is, based on a particular role ID from field 204 of role-based master table 201, one can quickly identify which of the role-based permission tables (e.g., tables 202-203) should be examined based on the associated permission table ID from field 205 (e.g., directory and/or filename). From the identified role-based permission table, one can determine the permissions for a particular resource for a user that has the capacity of a particular role. Note that data structures as shown in FIG. 2 are described for illustration purposes only; other formats or architectures may also be utilized.

Figure 3:
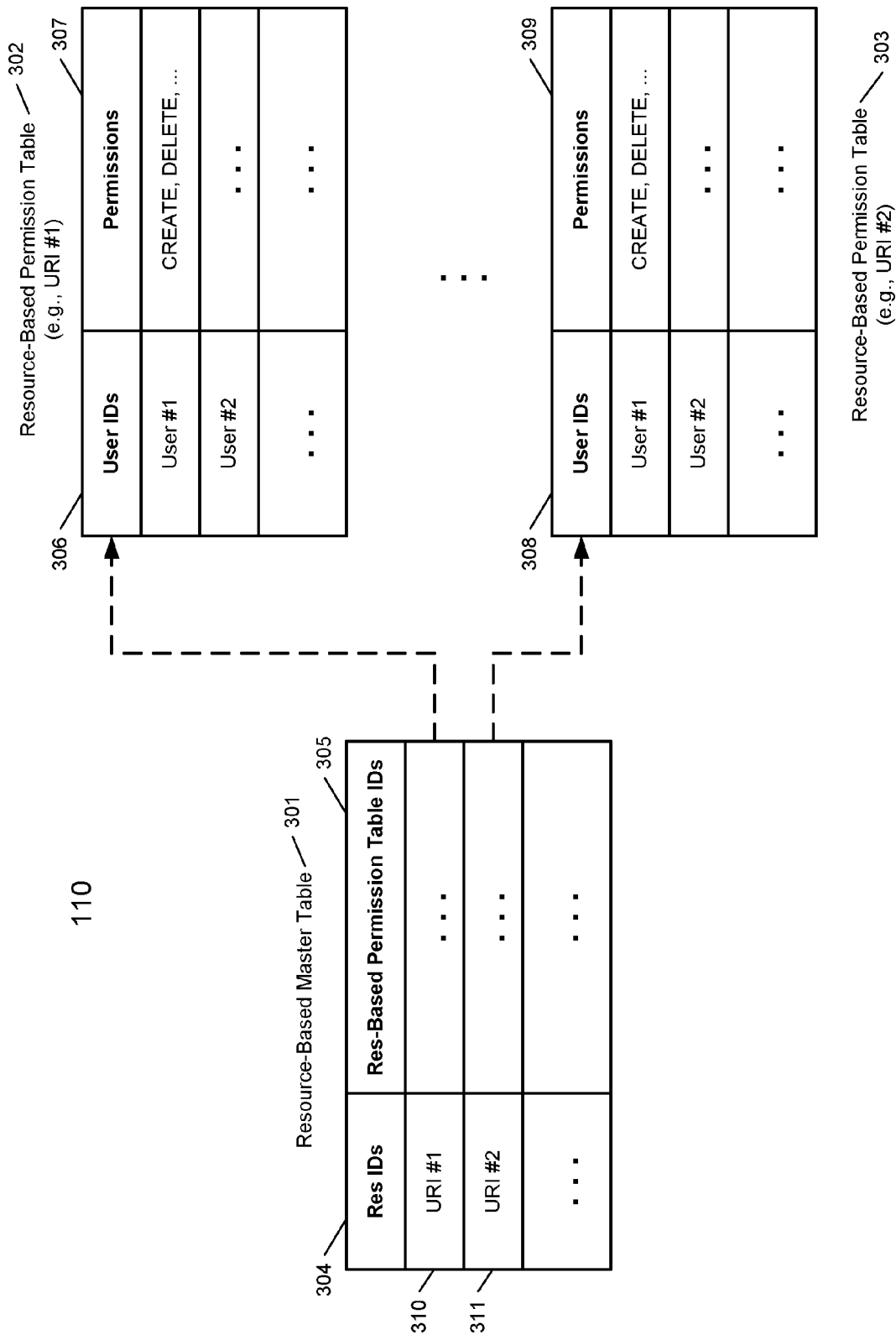
FIG. 3 is a block diagram illustrating an example of a resource-based permission database according to one embodiment of the invention.

FIG. 3 is a block diagram illustrating an example of a resource-based permission database according to one embodiment of the invention. Referring to FIG. 3, in one embodiment, resource-based permission database 110 includes resource-based master table 301 having entries indexed based on resource IDs (e.g., universal resource locators or URIs) that identify a variety of resources. Each resource, such as resources 310-311, is associated with one of resource-based permission table IDs 305 that uniquely identifies a particular resource-based permission table associated with the corresponding resource, such as, resource-based permission tables 302-303. A resource-based permission table ID may include a directory name and/or filename of a specific file that contains the corresponding resource-based permission table.

In one embodiment, each of the resource-based permission tables 302-303 includes entries indexed based on user IDs (e.g., users 306 and 308), and each of the user IDs is associated with a list of one or more permissions or operations (e.g., permissions 307 and 309) that can be performed by the associated user on the corresponding resource. That is, based on a particular resource ID from field 304 of resource-based master table 301, one can identify which of the resource-based permission tables (e.g., tables 302-303) should be examined based on the associated permission table ID from field 305 (e.g., directory and/or filename). From the identified resource-based permission table, one can determine the permissions for a particular user. Note that data structures as shown in FIG. 3 are described for illustration purposes only; other formats or architectures may also be utilized.

A permission maps a resource and an operation or permission to a set of users that are able to perform the operation on the given resource. In one embodiment, permission can include at least one of CREATE, READ, UPDATE, DELETE, and EXECUTE operations (collectively referred to herein as "CRUDE"). A CREATE permission allows a user to create a new resource and/or its associated property or properties on a particular domain or a server. A READ permission allows a user to read a resource and/or its associated property or properties from a particular domain or server. An UPDATE permission allows a user to modify a resource and/or its associated property or properties. A DELETE permission allows a user to remove a resource and/or its associated property or properties. An EXECUTE permission allows a user to modify one or more properties of a resource, but not the resource itself. In one embodiment, resources 117 (e.g., files and/or directories) may be organized in a tree like hierarchical structure from a root directory. In order to allow different degrees of granularity while granting permissions, according to one embodiment, permissions may be inherited down the tree from a parent to a child. The permission precedence may also follow from a parent to a child, meaning that permissions cannot get more restrictive as they move down the tree. That is, a child resource will inherit all the permissions from its direct or indirect parent resource(s).

A role can be one of a variety of roles created by an organization or enterprise. The permissions to perform certain operations are assigned to specific roles. Members of staff (or other system users) are assigned particular roles, and through those role assignments acquire the permissions to perform particular system functions. Since users are not assigned permissions directly, but only acquire them through their role (or roles), management of individual user rights becomes a matter of simply assigning appropriate roles to the user; this simplifies common operations, such as adding a user, or changing a user's department.

In addition, referring back to FIG. 1, APIs 105 include a create role API 114 to allow an administrator to create a particular role, which is stored in role database 111. A user can utilize API 115 to add a user to a particular role or utilize API 116 to remove a user from a particular role. FIG. 4 is a block diagram illustrating an example of a role database according to one embodiment of the invention. Referring to FIG. 4, role table 111 includes entries indexed based on role IDs 401 that identify a variety of roles, where each role ID is associated with one or more user IDs 402 that are members of the corresponding role. Referring to FIGS. 1 and 4, in response to a request, role management module 108 is configured to create a new role via API 114, which will add a new entry to role table 111. In addition, a user can be added to or removed from a particular role via APIs 115 and 116, respectively, where the corresponding user ID may be added to or removed from field 402 of the corresponding entry in role table 111.

Note that the terms of "operation" and "permission" are interchangeable terms throughout this application. For example, when an operation is CREATE, it represents a permission to perform an operation of CREATE, or vice versa. When a request for a permission associated with a resource is to be granted to or revoked from a user, according to one embodiment, the request includes a first parameter identifying a resource being accessed (e.g., URI), a second parameter identifying a user (e.g., user ID) who will be granted or will lose a permission, and an operation (e.g., permissions such as any of the CRUDE permissions described above). Examples of the corresponding APIs can be defined as follows:

Grant_permission_to_user (resource, user, operation); and

Revoke_permission_from_user (resource, user, operation)

Figure 5:
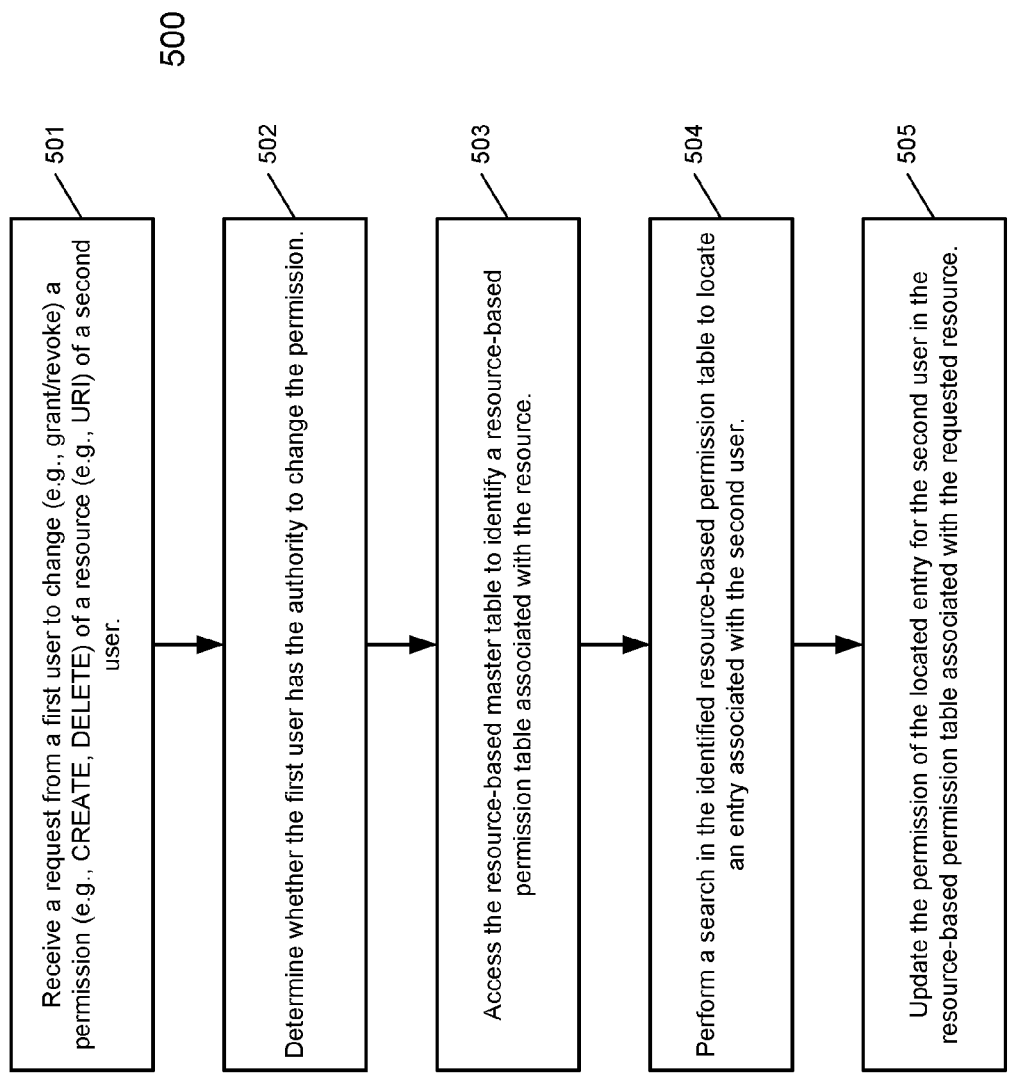
FIG. 5 is a flow diagram illustrating a method for changing a permission of a user concerning a resource according to one embodiment of the invention.

FIG. 5 is a flow diagram illustrating a method for changing a permission of a user concerning a resource according to one embodiment of the invention. For example, method 500 may be performed by authorization system 104 of FIG. 1. Referring to FIGS. 1-5, at block 501, a request is received from a first user (e.g., user 101) to change (e.g., grant or revoke) a permission for a resource of a second user (e.g., user 102). The request may be received via one of APIs 112-113. The request may include as part of its parameters a resource ID identifying the resource, a user ID identifying a second user, and a permission ID identifying the permission. In addition, a first user ID of the first user can also be ascertained based on the request in general. In response to the request, at block 502, it is determined whether the first user has the authority to change the permission of the second user. Such an authorization may be requested by the first user based on a resource having information indicating a desire to change a permission of the second user. In one embodiment, the API for granting/revoking a permission of a user can also be defined as a resource using a calling convention or scheme of <resource, permission, user>, where the "resource" specifies the operation (e.g., grant or revoke) on another user. For example, if a first user wishes to grant a permission of a particular resource to a second user, the first user may issue a call to the API as (/permissions/second user/grant/, EXECUTE, first user). In this example, the first user is examined by the system whether the first user has the EXECUTE permission on the resource of/permissions/second user/grant/.

If it is determined the first user has the authority, at block 503, permission management module 107 is configured to access resource-based permission master table 301 to identify a resource-based permission table (e.g., one of tables 302-303) associated with the resource. In one embodiment, permission management module 107 extracts the resource identifier (e.g., URI) from the request and performs a lookup operation on master table 301 to locate an entry having a resource ID that matches the one from the request (e.g., lookup based on column 304). A resource-based permission table identifier (e.g., filename) is retrieved from the corresponding field 305 of the located entry.

In this example, it is assumed that table 302 is the resource-based permission table corresponding to the resource ID extracted from the request. At block 504, a search is performed on the identified resource-based permission table to locate an entry associated with the second user identified in the request. In this example, permission management module 107 is configured to look up based on column 306 to identify an entry having a user ID that matches the user ID of the second user. Once the entry of the second user is identified from the resource-based permission table, at block 505, the permissions (e.g., column 307) of the identified entry are updated for the second user. If a permission is being added, the operation identified from the request is added to field 307. Similarly, if a permission is being revoked, the operation identified from the request is removed from field 307.

According to one embodiment, APIs 112-113 can also be utilized to grant or revoke a permission to and from a role of users. Examples of such APIs can be defined as follows:

Grant_permission_to_role (resource, role, operation); and

Revoke_permission_from_role (resource, role, operation)

Figure 6:
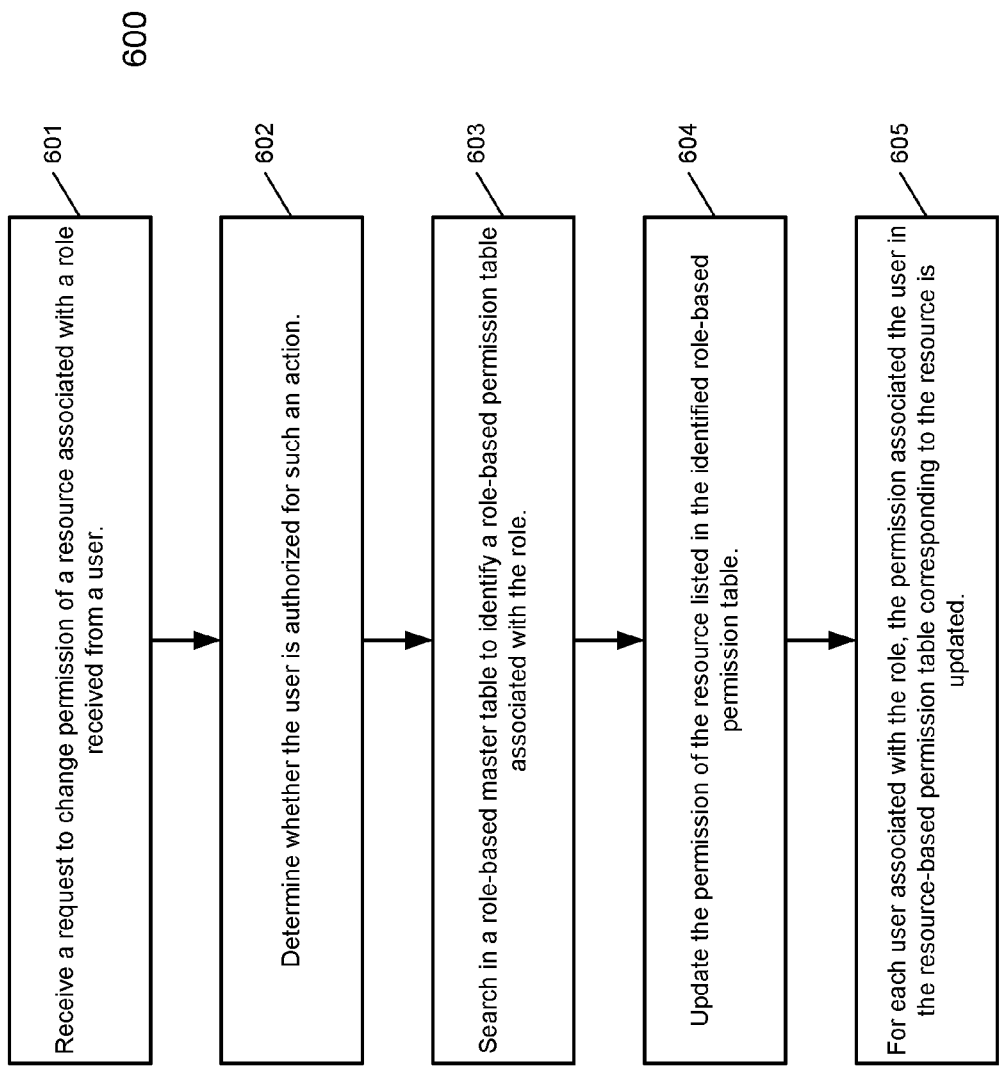
FIG. 6 is a flow diagram illustrating a method for changing a permission of a role according to one embodiment of the invention.

FIG. 6 is a flow diagram illustrating a method for changing a permission of a role according to one embodiment of the invention. Method 600 may be performed by authorization system 104 of FIG. 1. Referring to FIGS. 1-4 and 6, at block 601, at block 601, a request is received from a user (e.g., user 101) to change (e.g., grant or revoke) a permission of a resource of a role. The request may be received via one of APIs 112-113. The request may include as part of parameters a resource ID identifying the resource, a role ID identifying a role, and a permission ID identifying the permission. In addition, a user ID of the user can also be ascertained based on the request.

In response to the request, at block 602, it is determined whether the user has the authority to change the permission of the role based on the user's role. In one embodiment, authorization verification module 106 is configured to extract a user ID of the user from the request and access role database 111 to determine whether the user has the authority to change the permission, for example, using the techniques described above.

At block 603, a search is performed within a role-based master table to identify a role-based permission table associated with the role. In one embodiment, permission management module 107 is configured to access role-based master table 201 to identifying an entry from column 204 having a role that matches the role extracted from the request. From the corresponding field 205 of the matching entry, a role-based permission table identifier (e.g., filename) is retrieved and the associated role-based permission table is identified. In this example, it is assumed that role-based permission table 202 is the one associated with the resource identified from the request. From table 202, a search is conducted based on a resource ID extracted from the request, by matching the corresponding ones from column 206 to locate an entry that matches the resource ID. Once the entry has been identified, at block 604, the permissions of corresponding field 207 are updated.

In addition, at block 605, for each of the users associated with the role, permissions of the user in the resource-based permission table corresponding to the resource are updated.

In one embodiment, the users associated with the role are identified based on information of role table 111 of FIG. 4, for example, by matching the role ID in column 401. For each of the users identified from the corresponding column field 402, the permissions of the corresponding column field such as field 307 of a resource-based permission table associated with the resource identified in the request are updated.

According to one embodiment, APIs 115-116 can be utilized to add or remove a user to or from a role, which may affect the permissions of the user. Examples of the APIs 115-116 may be defined as follows:

Add_user_to_role (role, user); and
Remove_user_from_role (role, user)

Figure 7:
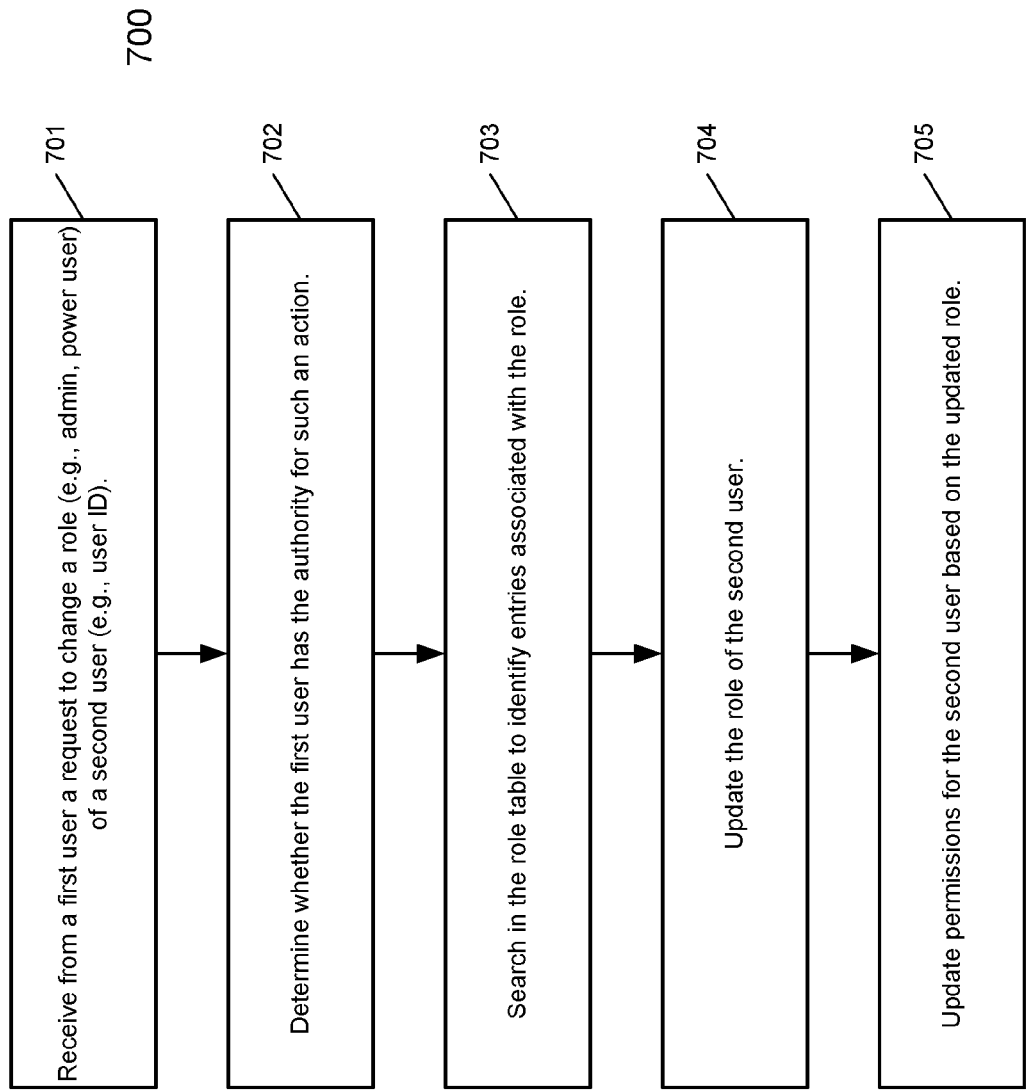
FIG. 7 is a flow diagram illustrating a method for changing a role of a user according to one embodiment of the invention.

FIG. 7 is a flow diagram illustrating a method for changing a role of a user according to one embodiment of the invention. Method 700 may be performed by authorization system 104 of FIG. 1. Referring to FIGS. 1-4 and 7, at block 701, a request is received from a first user to change a role of a second user. The request may be received via one of APIs 115-116 and include a role ID and a user ID. At block 702, it is verified by authorization verification module 106 whether the first user has the authority to change the role of the second user. At block 703, role management module 108 is configured to access role table 111 to update the user in an entry corresponding to the role identified in the request at block 704. If the request is to add a user to the role, the user ID is added to the entry. If the request is to remove the user from the role, the user ID is removed from the entry.

In addition, at block 705, permissions of the second user are updated based on changing of the role of the second user. In one embodiment, if the user is added to a role, all permissions associated with the role will be automatically granted to the user. For example, a role-based permission table (e.g., role-based permission table 202) associated with the new role is identified. For each of the resources listed in the role-based permission table, the associated permissions are added to the second user's entry in a resource-based permission table associated with the corresponding resource (e.g., resource-based permission table 302). Similarly, if the user is removed from the role, all permissions associated with the role will be automatically revoked from the user.

According to one embodiment, a new role can also be created and a list of users associated with a particular role may be retrieved via other APIs such as API 114. Examples of such APIs may be defined as follows:

Create_role (name);
Delete_role (name);
List_users_in_role (role)

A new role can be added to role database 111 using create_role( ) interface, while a role can also be removed from role database 111 using delete_role( ) interface. Note that when a role is added or removed, permissions associated with the role may be affected for those users associated with that role. In addition, a list of users that are associated with a particular role can be retrieved from role database 111 using list_users_in_role( ) interface.

In order to allow different degrees of granularity while granting permissions, according to one embodiment, permissions may be inherited down the tree from a parent to a child. The permission precedence may also follow from a parent to a child, meaning that permissions cannot get more restrictive as they move down the tree. That is, a child resource will inherit all the permissions from its direct or indirect parent resource(s).

Figure 8:
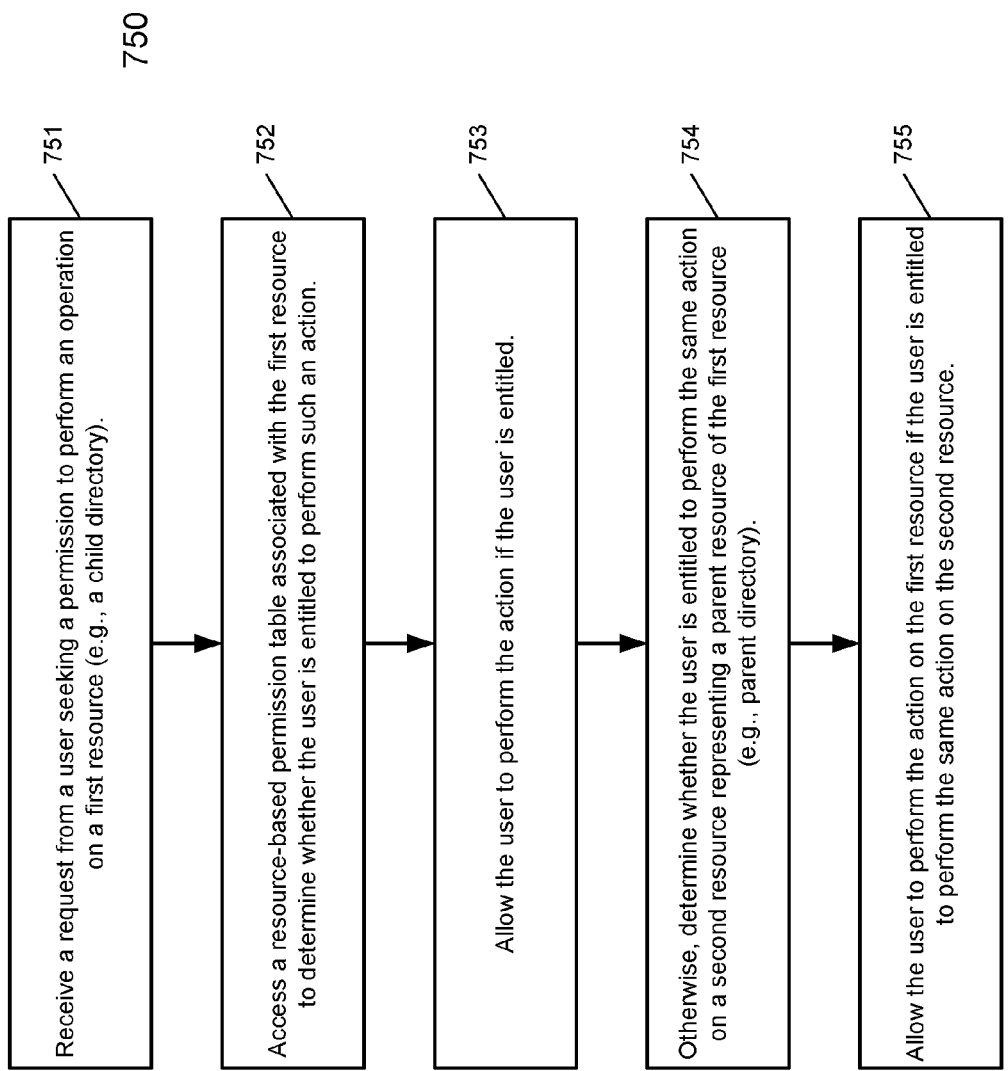
FIG. 8 is a flow diagram illustrating a method for determining whether the use has authority to access a resource according to one embodiment of the invention.

FIG. 8 is a flow diagram illustrating a method for determining whether the user has authority to access a resource according to one embodiment of the invention. Method 750 may be performed by authorization system 104 of FIG. 1. Referring to FIGS. 1-4 and 8, at block 751, a request is received from a user via APIs 105 for accessing one of resources 117. The request includes a first parameter identifying a first resource (e.g., a URI such as ./ . . . /parent_directory/child_directory) being accessed, a second parameter identify a user (e.g., user ID) who initiates the request, and an operation (e.g., permissions such as any of the CRUDE permissions described above) the user wishes to perform on the first resource. In response, at block 752, a resource-based permission table associated with the first resource is accessed to determine whether the user is entitled to perform an action identified from the request. If so, at block 753, the user is allowed to perform the action on the first resource. Otherwise, at block 754, a resource-based permission table associated with a second resource representing a parent resource of the first resource (e.g., ./ . . . /parent_directory) to determine whether the user is entitled to perform the same action on the second resource. If so, at block 755, the user is allowed to perform the action on the first resource (e.g., child resource). The above operations may be recursively performed until a parent resource having the sought permission has been found in which case the user will be allowed, or alternatively, until the root parent has been reached in which case the user will be denied. That is, a child resource inherits all of the permissions from its parent resource(s).

Figure 9:
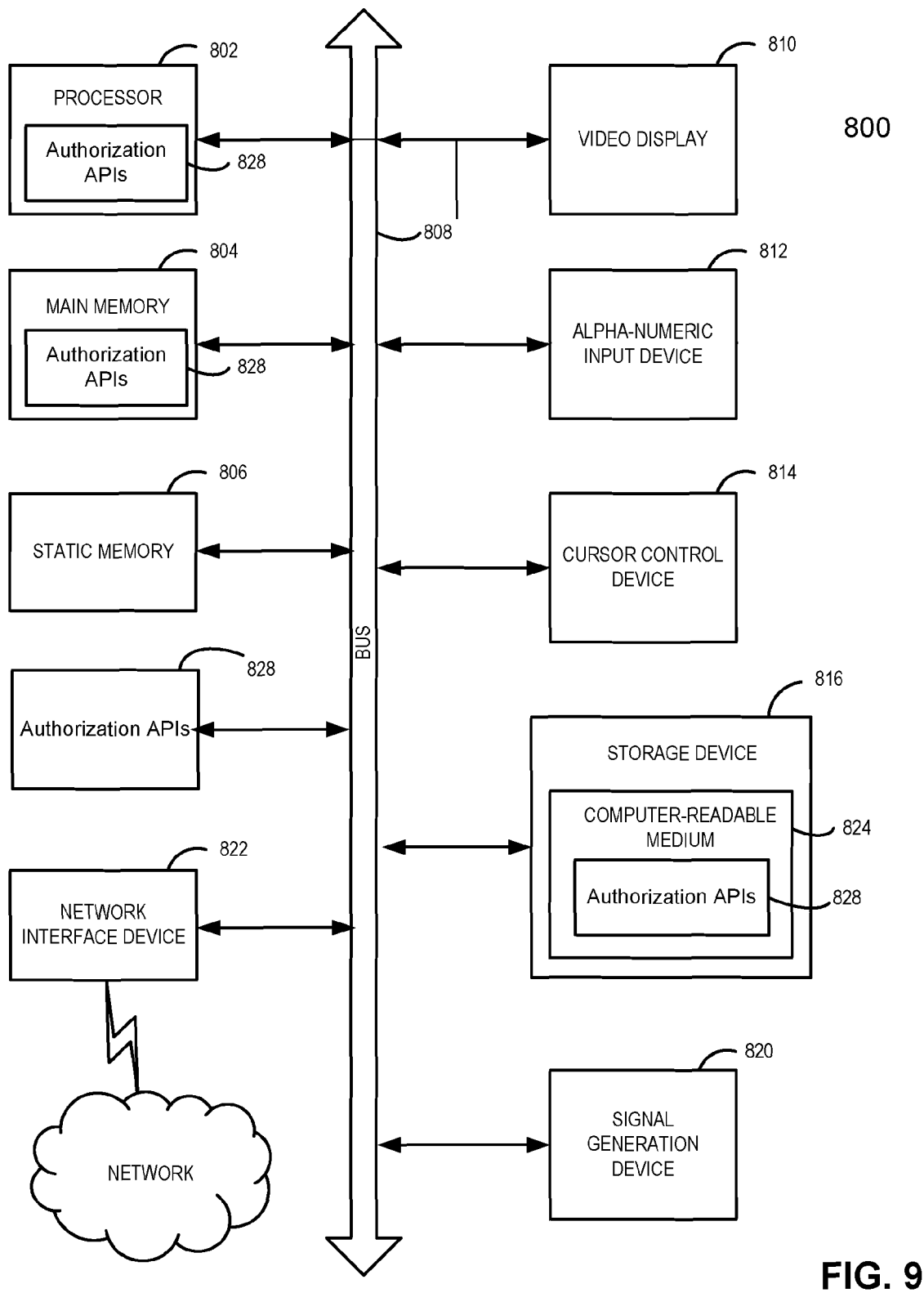
FIG. 9 illustrates a data processing system which may be used with an embodiment of the invention.

FIG. 9 illustrates a data processing system which may be used with an embodiment of the invention. For example, system 800 may represent a client or a server as shown in FIG. 1. Referring to FIG. 9, system 800 may present a diagrammatic representation of a machine in the exemplary form of a computer system within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet.

The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processor 802, a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a data storage device 816, which communicate with each other via a bus 808.

Processor 802 represents one or more general-purpose processors such as a microprocessor, a central processing unit, or the like. More particularly, the processor may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 802 may also be one or more special-purpose processors such as an application specific integrated circuit (ASIC), a field programmable gate array (FPGA), a digital signal processor (DSP), network processor, or the like. The processor 802 is configured to execute the instructions 828 for performing the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 816 may include a computer-accessible storage medium 824 (also known as a machine-readable storage medium or a computer-readable medium) on which is stored one or more sets of instructions or software (e.g., module 828) embodying any one or more of the methodologies or functions described herein. The module 828 may also reside, completely or at least partially, within the main memory 804 and/or within the processor 802 during execution thereof by the computer system 800, the main memory 804 and the processor 802 also constituting machine-accessible storage media. The module 828 may further be transmitted or received over a network via the network interface device 822.

The computer-readable storage medium 824 may also be used to store the some software functionalities described above persistently. While the computer-readable storage medium 824 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The modules 828, components and other features described herein can be implemented as discrete hardware components or integrated in the functionality of hardware components such as ASICS, FPGAs, DSPs or similar devices. In addition, the modules 828 can be implemented as firmware or functional circuitry within hardware devices. Further, the modules 828 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:
receiving, by a processing device, a request of a user to perform an operation with respect to a first resource, the request identifying the user, the first resource and the requested operation;
in response to the request, determining, by the processing device and in view of a resource-based master data structure, a first resource-based permission data structure of a plurality of resource-based permission data structures, the first resource-based permission data structure associated with the first resource;
accessing, by the processing device, the first resource-based permission data structure to identify a first resource entry associated with the user;
upon determining that the first resource entry associated with the user does not indicate that the user has a permission to perform the requested operation with respect to the first resource, determining, by the processing device, a second resource-based permission data structure of the plurality of resource-based permission data structures, the second resource-based permission data structure associated with a second resource that is a parent of the first resource;

accessing, by the processing device, the second resource-based permission data structure to identify a second resource entry associated with the user; and upon determining that the second resource entry associated with the user indicates that the user has a permission to perform the requested operation with respect to the second resource, allowing the user to perform the requested operation with respect to the first resource.

2. The method of claim 1, wherein the request of the user is received via a service application programming interface (API) of an authorization server.

3. The method of claim 1, wherein the requested operation is any one of creating the first resource, reading the first resource, updating the first resource, deleting the first resource, or modifying one or more properties of the first resource.

4. The method of claim 1, further comprising maintaining the resource-based master data structure having a plurality of entries, each entry corresponding to a particular resource linked with a corresponding resource-based permission data structure, including the first and second resources linked with the first and second resource-based permission data structures.

5. The method of claim 1, further comprising:

upon determining that the first resource entry associated with the user indicates that the user has the permission to perform the requested operation with respect to the first resource, allowing the user to perform the requested operation with respect to the first resource.

6. The method of claim 1, wherein the first resource-based permission data structure comprises a plurality of entities, each entry corresponding to a user associated with one or more permissions for accessing the first resource, and wherein the second resource-based permission data structure comprises a plurality of entities, each entry corresponding to a user associated with one or more permissions for accessing the second resource.

7. The method of claim 1, further comprising:

upon determining that the second resource entry associated with the user indicates that the user does not have the permission to perform the requested operation with respect to the second resource, determining whether the second resource is associated with a third resource that is a parent of the second resource;

upon determining that the second resource is not associated with the third resource, preventing the user from performing the requested operation with respect to the first resource;

upon determining that the second resource is associated with the third resource, determining a third resource-based permission data structure of the plurality of resource-based permission data structures, the third resource-based permission data structure associated with the third resource;

accessing the third resource-based permission data structure to identify a third resource entry associated with the user; and upon determining that the third resource entry associated with the user indicates that the user has a permission to perform the requested operation with respect to the third resource, allowing the user to perform the requested operation with respect to the first resource.

8. A non-transitory computer-readable medium having instructions stored therein, which when executed by a processing device, cause the processing device to:

receive a request of a user to perform an operation with respect to a first resource, the request identifying the user, the first resource and the requested operation;

in response to the request, determine, in view of a resource-based master data structure, a first resource-based permission data structure of a plurality of resource-based permission data structures, the first resource-based permission data structure associated with the first resource;

access the first resource-based permission data structure to identify a first resource entry associated with the user;

upon determining that the first resource entry associated with the user does not indicate that the user has a permission to perform the requested operation with respect to the first resource, determine a second resource-based permission data structure of the plurality of resource-based permission data structures, the second resource-based permission data structure associated with a second resource that is a parent of the first resource;

access the second resource-based permission data structure to identify a second resource entry associated with the user; and upon determining that the second resource entry associated with the user indicates that the user has a permission to perform the requested operation with respect to the second resource, allow the user to perform the requested operation with respect to the first resource.

9. The non-transitory computer-readable medium of claim 8, wherein the request of the user is received via a service application programming interface (API) of an authorization server.

10. The non-transitory computer-readable medium of claim 8, wherein the processor is further to:

maintain the resource-based master data structure having a plurality of entities, each entry corresponding to a particular resource linked with a corresponding resource-based permission data structure, including the first and second resources linked with the first and second resource-based permission data structures.

11. The non-transitory computer-readable medium of claim 8, wherein the processor is further to:

upon determining that the first resource entry associated with the user indicates that the user has the permission to perform the requested operation with respect to the first resource, allow the user to perform the requested operation with respect to the first resource.

12. The non-transitory computer-readable medium of claim 8, wherein the first resource-based permission data structure comprises a plurality of entries, each entry corresponding to a user associated with one or more permissions for accessing the first resource, and wherein the second resource-based permission data structure comprises a plurality of entries, each entry corresponding to a user associated with one or more permissions for accessing the second resource.

13. The non-transitory computer-readable medium of claim 8, wherein the processor is further to:

upon determining that the second resource entry associated with the user indicates that the user does not have the permission to perform the requested operation with respect to the second resource, determining whether the second resource is associated with a third resource that is a parent of the second resource;

upon determining that the second resource is not associated with the third resource, preventing the user from performing the requested operation with respect to the first resource;

upon determining that the second resource is associated with the third resource, determining a third resource-based permission data structure of the plurality of resource-based permission data structures, the third resource-based permission data structure associated with the third resource;

accessing the third resource-based permission data structure to identify a third resource entry associated with the user; and upon determining that the third resource entry associated with the user indicates that the user has a permission to perform the requested operation with respect to the third resource, allowing the user to perform the requested operation with respect to the first resource.

14. The non-transitory computer-readable medium of claim 8, wherein the requested operation is any one of creating the first resource, reading the first resource, updating the first resource, deleting the first resource, or modifying one or more properties of the first resource.

15. A system comprising:
a memory; and
a processing device, coupled to the memory, to:
receive a request of a user to perform an operation with respect to a first resource, the request identifying the user, the first resource and the requested operation;
in response to the request, determine, in view of a resource-based master data structure, a first resource-based permission data structure of a plurality of resource-based permission data structures, the first resource-based permission data structure associated with the first resource;
access the first resource-based permission data structure to identify a first resource entry associated with the user;
upon determining that the first resource entry associated with the user does not indicate that the user has a permission to perform the requested operation with respect to the first resource, determine a second resource-based permission data structure of the plurality of resource-based permission data structures, the second resource-based permission data structure associated with a second resource that is a parent of the first resource;
access the second resource-based permission data structure to identify a second resource entry associated with the user; and
upon determining that the second resource entry associated with the user indicates that the user has a permission to perform the requested operation with respect to the second resource, allow the user to perform the requested operation with respect to the first resource.

16. The system of claim 15, wherein the processing device is further to maintain the resource-based master data structure having a plurality of entries, each entry corresponding to a particular resource linked with a corresponding resource-based permission data structure, including the first and second resources linked with the first and second resource-based permission data structures.

17. The system of claim 15, wherein the processing device is further to:
upon determining that the first resource entry associated with the user indicates that the user has the permission to perform the requested operation with respect to the first resource, allow the user to perform the requested operation with respect to the first resource.

18. The system of claim 15, wherein the processing device is further to:
upon determining that the second resource entry associated with the user indicates that the user does not have the permission to perform the requested operation with respect to the second resource, determine whether the second resource is associated with a third resource that is a parent of the second resource;
upon determining that the second resource is not associated with the third resource, prevent the user from performing the requested operation with respect to the first resource;
upon determining that the second resource is associated with the third resource, determine a third resource-based permission data structure of the plurality of resource-based permission data structures, the third resource-based permission data structure associated with the third resource;
access the third resource-based permission data structure to identify a third resource entry associated with the user; and
upon determining that the third resource entry associated with the user indicates that the user has a permission to perform the requested operation with respect to the third resource, allow the user to perform the requested operation with respect to the first resource.

19. The system of claim 15, wherein the request of the user is received via a service application programming interface (API) of an authorization server.

20. The system of claim 15, wherein the first resource-based permission data structure comprises a plurality of entries, each entry corresponding to a user associated with one or more permissions for accessing the first resource, and wherein the second resource-based permission data structure comprises a plurality of entries, each entry corresponding to a user associated with one or more permissions for accessing the second resource.

* * * * *